(No Model.)
A. & E. L. WYCKOFF.
PIPE CASING OR CONDUIT.
No. 409,265. Patented Aug. 20, 1889.
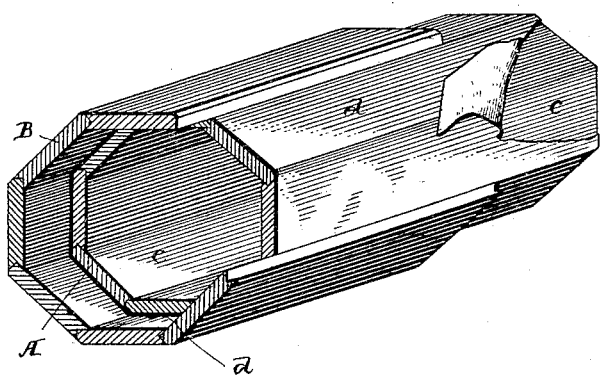
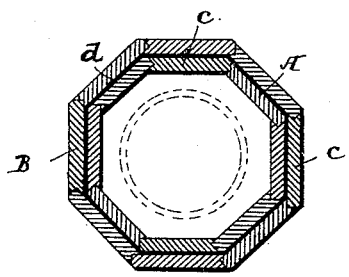

UNITED STATES PATENT OFFICE.

ARCALOUS WYCKOFF AND ERNEST L. WYCKOFF, OF ELMIRA, NEW YORK.

PIPE CASING OR CONDUIT.

SPECIFICATION forming part of Letters Patent No. 409,265, dated August 20, 1889.

Application filed October 30, 1888. Serial No. 289,526. (No model.)

*To all whom it may concern:*

Be it known that we, ARCALOUS WYCKOFF and ERNEST L. WYCKOFF, citizens of the United States, residing at Elmira, in the county of Chemung and State of New York, have invented certain new and useful Improvements in Pipe Casings or Conduits, of which the following is a specification.

This invention relates to the construction of non-conducting casings for inclosing steam and similar pipes; and the invention consists in a casing composed of an inner and an outer wooden shell combined with an interposed layer of non-conducting material, as hereinafter more fully set forth.

Figure 1 is a perspective view of a section of the casing, a portion of the outer shell being removed to more clearly illustrate its construction. Fig. 2 is a cross-section.

The object of this invention is to produce a non-conducting casing for steam and similar pipes, which will be durable, light in weight, cheap, and easily applied.

To produce such a casing, we first form an inner shell A of a diameter somewhat greater than that of the pipe which it is to inclose, so as to leave an air-space all around between this inner shell A and the pipe, which latter is indicated by dotted lines in Fig. 2. We also form an outer shell B of such a diameter that when placed over the inner shell A there will be a space left between the two, which space we fill with any suitable non-conducting material, thus forming a casing composed of an inner and an outer shell with an interposed layer of non-conducting material. These shells A and B we make of wood, because the wood is of itself a better non-conductor of heat than metal, and because it can be more cheaply employed.

In Fig. 1 the two shells A and B are shown built up each of a series of strips of wood united by any suitable means, so as to form octagonal tubes or shells c, indicating the individual strips of wood in each. It will, however, be understood that the shells may be square or other shape in cross-section.

In constructing this casing the inner shell A is first formed, and then the non-conducting material d, which may be of paper suitably prepared, or of other material in the form of sheets or strips, is then wrapped or wound tightly around the inner shell, after which the outer shell B is applied thereto, as clearly shown in Fig. 1, a cross-section of the same being shown in Fig. 2, in which the layer of non-conducting material d is shown as filling the space between the inner and outer shells.

The interposed layer d of non-conducting material can be applied by forcing it in a plastic condition into the space between the two shells, plaster-of-paris, either alone or mixed with other non-conducting substance, being suitable for the purpose and being easily applied.

The casing thus constructed can be made at the factory and shipped in quantities ready for use wherever wanted.

In laying steam-pipe with this casing the sections of the casing are merely slipped over the sections of steam-pipe as the latter are placed in position, with small blocks or rollers placed inside of the casing for the steam-pipe to rest upon, which not only raises the steam-pipes so as to prevent contact of it with the inner shell and leave an air-space between them, but also enables the steam-pipe to be moved longitudinally by expansion and contraction within the casing without in any manner disturbing or affecting the latter.

By uniting the adjoining ends of the sections of the casing so as to render the joints air and water tight, (and which, of course, will be done by the workmen when laying it,) it will be seen that a layer of confined air will surround the steam-pipe throughout its entire length, and which air, being of itself a good non-conductor, will, with the casing, prevent the escape or transmission of heat from the steam-pipe, and thus prevent the condensation of the steam within the pipe.

While this casing is designed especially for use in connection with pipes for conveying steam, it is obvious that it may be applied advantageously to pipes for conveying hot water or hot air at a distance, as is frequently necessary in drying-kilns for seasoning lumber, drying bricks preparatory to burning them, or dry-houses of any kind. So, too, it can be advantageously used to inclose pipes for conveying the cooling fluids or mixtures used for the manufacture of ice or for refrigerating purposes in cold-storage rooms and the like, especially where the apparatus is located at some distance, the casing in such cases serving to prevent the passage of heat from the atmosphere or the earth, as the case may be, to the cooling fluid or mixture or air in the pipes.

We do not claim, broadly, a casing made of two shells and an intervening body of non-conducting material; but

We claim—

As a new article of manufacture, the herein-described casing for pipes, consisting of a tube composed of an inner and an outer shell each built up of strips of wood united to form a hollow cylinder, and a layer of non-conducting material interposed between said shells.

In testimony whereof we have signed our names to this specification in the presence of two subscribing witnesses.

A. WYCKOFF.
    ERNEST L. WYCKOFF.

Witnesses:
 J. I. STANTON,
 FRED. L. WOODRUFF.